United States Patent [19]

Lejon

[11] 3,789,372

[45] Jan. 29, 1974

[54] SELF TRACKING BEAM ACCESSIBLE MEMORY AND ADDRESSING METHOD THEREFOR

[76] Inventor: Jean C. Lejon, 16, boulevard Soult, 75012 Paris, France

[22] Filed: Jan. 29, 1973

[21] Appl. No.: 327,811

[30] Foreign Application Priority Data

Jan. 27, 1972 France .............................. 7202676

[52] U.S. Cl. ......... 340/173 CR, 178/5.4 H, 178/30, 315/8.5, 315/21 R, 340/173 LT, 340/173 LM

[51] Int. Cl. ........................... G11c 5/02, G11c 7/00

[58] Field of Search.. 340/173 CR, 173 LT, 173 LS, 340/173 LM; 178/5.4 H, 30; 315/8.5, 21 R; 95/4.5 R, 4.5 J

[56] References Cited

UNITED STATES PATENTS 3,721,962 3/1973 Foster et al. ................ 340/173 CR

OTHER PUBLICATIONS

Herd et al., Electron–Beam–Addressed Memory, IBM Technical Disclosure Bulletin, Vol. 10, No. 12, 5/68, pp. 1924–1925.

Reynolds et al., Position Resolution System, IBM Technical Disclosure Bulletin, Vol. 10, No. 3, 8/67, pp. 284–285.

*Primary Examiner*—Bernard Konick
*Assistant Examiner*—Stuart Hecker
*Attorney, Agent, or Firm*—Flynn & Frishauf

[57] ABSTRACT

A light beam or an electron beam is deflected by analog methods to one of a plurality of acceptance zones, each serving a multiplicity of words arrayed in one dimension of the memory and accessed by a word selection line or stripe directed in the other dimension of the array. Each word selection line is an extension of a median line of the acceptance zone to which it relates. Pairwise distinctive guiding means are provided in each acceptance zone on either side of the median and as borders on either side of each word selection stripe, of such a kind as to generate a pair of distinctive signals when swept by the access beam. From these signals an error signal is derived and applied to the deflection circuits to provide tracking of the beam. Counting spots on the word selection stripe enable digital circuits to stop the sweep at the precise word address, after which the word is swept to read or write information. Beam tracking may also be provided for word stripes in the same manner as for word selection stripes.

17 Claims, 8 Drawing Figures

SELF TRACKING BEAM ACCESSIBLE MEMORY AND ADDRESSING METHOD THEREFOR

This invention relates generally to methods and systems of addressing memories in which information is stored in the form of binary digits ("bits"), most often grouped in "words" in a two dimensional array employing what may be broadly described as a sensitive surface on which the digits are represented by the presence or absence of a signal at various points in the sensitive surface. In these methods and systems, access to the proper storage location of the memory for writing in or reading out information is done by directing an electromagnetic or electronic beam to the particular location. The beam is capable of sweeping all of the points of the sensitive surface. The method and system for directing it to a particular point is referred to as "addressing" method or system.

More particularly this invention relates to the method of and system for addressing such a memory in which the displacement of the access beam along the surface of the memory array is guided by means of elements carried by the structure of the memory and interposed in the memory array in a manner of the type described, for example, in U.S. Pat. Nos. 3,121,216; 3,351,920, and 3,333,254.

Optical or opto-electronic memory devices heretofore known are characterized by the provision of a sensitive surface comprising either a certain number of points distributed over the surface in an array constituting a matrix in two mutually perpendicular directions where each of the points of the surface is capable of assuming either of two different states, each corresponding to one of the binary digits 1 or 0 used for binary coded information, or else comprising a certain number of holograms. Whatever may be the nature of the particular memory, access to it for its utilization, both for writing and reading, is provided by a system capable of locating in space the predetermined point which corresponds to the particular information. In current practice such systems principally comprise a movable beam which may be an electromagnetic beam such as light, either coherent or otherwise, or an electron beam, the latter being suitable if the memory is located in an evacuated space. In either case the beam is deflected by means of two deflecting devices operating in the two perpendicular directions X and Y of the matrix array. These directions will hereinafter be referred to, solely for convenience, as horizontal deflection and vertical deflection respectively. As already mentioned, the operation of directing the beam to a predetermined point on the surface of the memory, having coordinates $x_0$, $y_0$ is commonly called "addressing" and the addressing apparatus most commonly comprises deflecting plates if an electron beam is involved, utilizing a deflection system similar to that used for deflecting a beam in a cathode ray tube, or else equipment utilizing variation of the index of refraction of the medium in which the beam travels, if the deflection of a luminous beam is involved. In any case, this double deflection involving both X and Y components must enable the point of the memory of which the coordinates are $x_0$ and $y_0$ to be found as quickly as possible and the control of these deflections is accordingly most commonly made by means of two electrical signals, for example two voltages proportional respectively to the values $x_0$ and $y_0$ of the coordinates of the point in question. In most cases these coordinates are calculated from a reference position which is simply the center of the rectangle formed by the memory array.

The quality of such a memory obviously depends primarily on the precision with which addressing can be accomplished, because this factor determines the number of memory points and hence the quantity of information that can be stored on a surface of a particular size. In practice the difficulties encountered in obtaining the necessary reliability in the addressing precision of the access beam of a memory has permitted only results that are in all respects very far from the theoretical limits ($10^{13}$ bits per $mm^2$). In the present state of the art either direct deflection or mechanical deflection is used.

Direct deflection of the beam by electrostatic fields (for electron beams) or by variation of the index by refraction (for electromagnetic rays) lead to inevitable distortions (field curvature effects, astigmatism, coma) that limit the precision of positioning with reference to the control signal to values of a few percent. On the other hand, such deflection has the advantage of being very rapid and of attaining access times down to a few microseconds or even nanoseconds.

Mechanical deflection devices for the beam provide, at least theoretically, better resolution, but they have the very serious inconvenience of being slow (several milliseconds) and to involve rather high manufacturing cost.

In a general way the limits of addressing precision are essentially a function of two factors, namely:

a. beam drift of every kind (center of reference, amplitude of deflection signals, sensitivity of the deflection system), b. beam shape distortion, practically inevitable because inherent in the system (astigmatism, beam deformation into cushion or trapezoidal cross section).

Accordingly, in the present state of the art, beam control devices do not provide beam addressing precision any greater than 100 points in each of the X and Y directions, that is to say a total of $10^4$ bits, and this only at the cost of considerable difficulty.

Finally, in the case of memories constituted by semiconductor integrated circuits, present day devices in production do not exceed a limiting number of 2048 bits, because the number of necessary external connections would lead to unacceptable reliability and price.

The object of the present invention is to provide an addressing method for the access beam of such a memory which will by simple methods and means enable the distortions and drift effects of prior deflection systems to be avoided. This object has been obtained by the invention to the extent of enabling a single beam to be addressed to a much higher number of points and easily to reach orders of magnitude of $10^6$ points distributed in a square matrix of 1,000 × 1,000 points.

It is likewise an object of this invention to provide a memory for the storing of information in the form of binary digits written on a plane surface in accordance with a matrix array with two orthogonal directions X and Y accessed by an electron of light beam subjected to two deflection components of directions X and Y in which the memory has provisions for guiding the beam precise locations in such a way that the effective capacity of the memory can be greatly increased.

SUBJECT MATTER OF THE PRESENT INVENTION:

Briefly, at least one of the beam deflection controls is subjected to guide means carried on the memory plane itself in such a way that the point of impact of the beam on the memory precisely follows these guide means on the memory surface, so that the addressing of a particular point takes place in three successive steps, namely:

- a first coarse deflection by "analog" forces bringing the spot to a relatively diffuse acceptance zone serving a particular part of the memory surface,
- a second deflection, gauged by digital means, to propel the spot along the word selection line corresponding to the aforesaid acceptance zone, and
- a third deflection, also digital, for scanning the word to be addressed, either for writing or reading.

The memory surface provided according to the present invention comprises a certain number of relatively ample acceptance zones each of which is associated in the X direction with a word selection line or stripe bordered by two guides, which may be referred to as an upper and lower guide, generating, under the influence of the beam spot, characteristic signals usable for guiding the beam. Each selection line has a certain number of spots for counting, off the places of the words that may be reached by the line in question. At right angles of each of these counting spots a word of a certain number of bits is written in the Y direction. In each of the acceptance zones there are two distinct regions separated by a horizontal line in the X direction extending as a prolongation of the word selection line associated with the zone, and each of these two regions is provided with means for generating, under the influence of the presence of the beam spot, characteristic signals usable for guiding the beam. Means are also provided for causing the beam to approach and then to follow the guide stripe by controlling the Y deflection by means of error signals obtained by the difference first, of the characteristic signals coming from the aforesaid two distinct regions of the acceptance zone, and thereafter, of the characteristic signals of the two guide borders of the word selection stripe.

In a general way it may be seen that constraining the beam to follow guide means provided on the memory surface itself makes it possible to assure the positioning of the spot with a heretofore unequalled precision, the spot being literally guided as by rails up to the exact point desired, and this in a manner totally independent of the electric sensitivity parameters and of the drifts and distortions of all kinds which are inherent in previous devices.

According to this invention the most important guide means carried by the memory are those provided for tracking the beam on a word selection stripe. Each such guide means is constituted of two guide borders that generate different and readily recognizable signals when they are swept by the spot. These guides can be provided in different ways, the most simple and effective being, according to the invention, to provide arrays of dashes constituting interrupted lines, with periodicity of $P_1$ for one of the guides and of $P_2$ for the other of the guides of the same pair, the periodicities $P_1$ ad $P_2$ being significantly different one from the other. The areas occupied by these guides of each pair are constituted of a material that reacts, under the effect of the luminous or electron impact spot, by generating signals (visible or invisible electromagnetic emission or secondary electron emission) at frequencies $f_1$ and $f_2$ respectively characteristic of each guide. The relative proportion of the frequency components $f_1$ and $f_2$ in the total signal received, as detected by any suitable known apparatus for this purpose, is characteristic of the position of the spot with respect to the center of the guide stripe defined by the two guides. The spot is accurately centered on the median line of the guide stripe when the frequency components $f_1$ and $f_2$ are equal. According to the invention the frequency components $f_1$ and $f_2$ generated by each of the guides of periodicity $P_1$ and $P_2$ respectively are utilized to generate an error signal which is applied, after amplification and such transformations as are necessary, to one of the delfection systems (X or Y) so as to control the beam so that the spot will accurately follow the guide stripe and hence the desired line on the memory surface.

A memory for storing information in binary coded form in accordance with the invention is provided with a first array for coarse positioning of the beam, constituted by the "acceptance zones" distributed in a regular way in accordance with an XY matrix over the entire surface of the memory, to each of which zones is associated a word selection line.

According to the invention each acceptance zone includes means for very rapidly guiding the spot towards the entrance of the word selection line associated with the zone. The spot is then under control of the guide borders and moves along the line to the entrance of the word to be accessed. The acceptance zones, the area of which is made large enough for their function, are addressed by the beam by conventional means and methods of relatively coarse precision, i.e., using by analog voltages representing the coordinates x and y of each of these zones. When the voltages corresponding to the acceptance zone to which the word being sought relates have been applied to the deflection system of the beam, it is assured that the spot will be located on the memory at some point in the particular acceptance zone that has been chosen, because the area of the zone is sufficient to provide this assurance in spite of all the drifts and distortions to which the beam may be subject. This now having been assured, it is possible to use provisions according to the invention by which each acceptance zone is so devised as to guide the spot rapidy to the entrance of the word selection line in which the word to be consulted is located. For this purpose each of the acceptance zones comprises two distinct regions each provided with means for generating characteristic signals indicating the presence of the spot in the particular region.

In a first manner of carrying out the invention, the two regions of each acceptance zone are provided with arrays of vertical stripes in the Y direction which may be electrically connected together or electrically discontinuous. These arrays of vertical stripes have respective periodicities $P_1$ and $P_2$ which generate, in response to a horizontal sweep by the spot, signals of frequencies $f_1$ and $f_2$ characteristic of the respective regions. The relative difference of these frequency components is used as an error signal and applied to the deflection system for the vertical Y direction to guide the spot towards the median line of the acceptance zone that separates the two regions and which is, moreover, located so as to be an extension of the word selection line which the spot must immediately afterwards sweep. Just as in the case of the guide borders above mentioned the vertical stripes of the acceptance zone may be conductive or constituted of photoconductive or photoemissive materials and may generate electromagnetic radiation in either the visible or the invisible spectral region or may give rise to the emission of secondary electrons.

In a second manner of carrying out the invention, the two regions of each acceptance zone (and similarly the upper and lower guides of each guide stripe) are simply constituted of continuous luminescent surfaces, each emitting radiation of a characteristic color when stimulated by the beam. In this case these colored radiations are transformed into two continuous electrical signals by appropriate photoelectric cells. The difference between these two continuous signals then constitutes the error signal applied to the deflection system in the Y direction to control the beam.

In a memory according to the invention, the binary digits are grouped in the form of words written in the Y direction, beginning on each of the word selection lines previously mentioned. The exact location in the horizontal coordinate direction X of each word beginning is physically indicated on the word selection line by the presence of a counting spot located between the two borders of each horizontal guide stripe, which the beam spot detects and counts in its sweep in the X direction. When the beam spot has counted the proper number of counting spots corresponding to the word to be accessed, further deflection in the X direction is blocked and the actual reading or writing of a word then takes place in the Y direction.

In order to accomplish what has just been described there are two possiblities within the scope of the invention: if the word to be read (a reading procedure will be given as an illustration of both reading and writing) is sufficiently short, it may be satisfactory to read it by simply sweeping the beam in the Y direction; if, on the contrary, a word has a relatively great length or if a higher precision in the resolution of reading is desired, it is also possible to provide, according to the invention, that each word stripe itself will be bordered by two guide borders respectively having periodicities $P_1$ and $P_2$ located on each side of the word to be read. These can, again, be used to obtain precise guiding of the spot in the Y direction at the constant value of the coordinate x corresponding to the word to be read.

According to the invention the addressing method applied to the access beam of a memory is thus composed of three successive steps which are, respectively

- a first coarse addressing step by conventional analog means, towards an acceptance zone in the neighborhood of the word to be read;
- a second step in which the beam is guided by digital steps determined by the counting spots, along the horizontal word selection line with its vertical position maintained by guide means bordering the word selection strips and finally,
- a third step in which the beam is displaced in the Y direction over the word to be read itself. As a variation of the method above described, the beam may likewise be subjected to the third step to guide means extending in the Y direction carried on the memory plane and bordering each word stripe.

In every case the guidance of the beam is accomplished by means of error signals obtained under the influence of the beam spot produced by signals generated by the aforesaid guide means located on the memory plane itself. As already mentioned, the guide means used are either areas emitting electromagnetic radiation that is readily detectable, such as for example light of different colors for the two guides of a guide stripe and/or for the two distinct regions of each acceptance zone, or surfaces or lines interrupted or subdivided with different periodicities $P_1$ and $P_2$ for each guide and for each region, so as to generate electromagnetic or electronic signals of different frequencies, hence readily detectable and capable of producing error signals by means of which the desired control of the deflection of the spot in the X or Y direction is accomplished.

Furthermore, the reflected or transmitted light may be used in the operation of memories of the type described. Reflected light is used when the support of the memory is opaque, whereas transmitted light may be used when a transparent support is provided for the memory. A particularly interesting example of the latter type of operation is provided when the memory consists of a "grid" inscribed on a transparent support that is applied to the external surface of the screen of a cathode ray tube of the luminous screen type. The "grid" in this case comprises at the same time the words of which the stored information consists and the guide means according to the invention (acceptance zones, guide stripes in the X direction and, if desired in Y also). In this case writing is made once and for all on each of a set of interchangeable inscribed grids, and reading is accomplished by means of one or more photoelectric cells external to the cathode ray tube which detect, from light coming through the screen, the modulations of the spot luminescence resulting from the guide means, the counting spots and the information words themselves. It then becomes one of the functions of the photoelectric cell or cells to pick up the signals from the guide means, from which the error signal is derived for controlling the beam in accordance with the invention. One of the fundamental advantages of this mode of operation lies in the fact that the efficiency of the guide means is such (a precision of 0.1 mm is easily obtained through a glass screen 4 mm thick) that the positioning of the memory on the external surface of the screen can be done in a relatively coarse manner, to a few mm more or less, for example. Another embodiment of the present invention of particular interest is that in which the memory is formed of a semiconductor structure comprising integrated active (bistable) elements the state of which corresponds to the bits written into memory points distributed over the entire surface of the memory in the form of a certain number of elementary "chips". In this case it is very easy to inscribe directly on each of the chips, at the time of manufacture of the integrated circuit, the acceptance zone and the word selection guide stripe corresponding to it. The provision of such a memory is thus particularly easy and can be used to select a word by displacing the spot along the word selection line in the X direction in a dynamic fashion in accordance with the method above described and, then in a static fashion so far as concerns the reading of the word itself associated to the word selection line. In this case there is an interchange of information with the active elements of the memory plane simply by means of the beam and of the basic circuits for power supply, reading and writing, and common bus of each chip, to the exclusion of all other connections which would be necessary in conventional semiconductor systems to connect each bistable element electrically with external facilities. This feature leads to a considerable advantage in terms of space saving, of improved reliability and in manufacturing cost reduction of such a memory.

For example, in order to provide a 1 Mbit (Megabit) memory, conventional techniques require at least 500 chips of 2,048 bits each. Each of these chips having on the average 16 connections, not counting the power supply connections, to address the various bistable circuits contained in it, this leads to a total number of connections equal to 500 × 16 = 8,888. By applying the method that is the subject of this invention, these 8,000 connections can be completely dispensed with.

The invention will be described by way of example with reference to the accompanying drawings, wherein.

Figure 1:
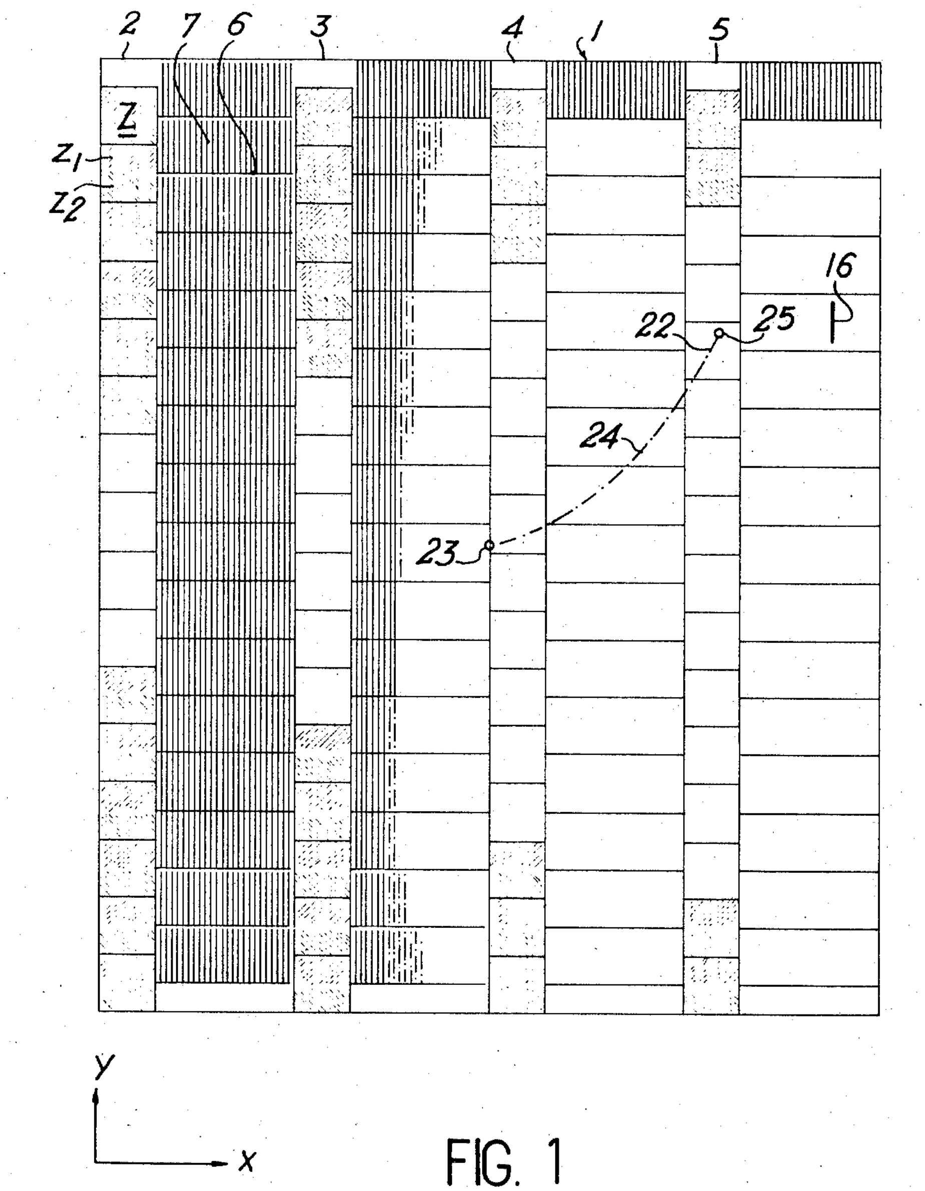
FIG. 1 is an overall diagram of a memory according to the invention.

FIG. 1 is a plan view of the rectangular surface of the memory 1, which is shown oriented with respect to two mutually perpendicular directions X and Y which will be referred to hereinafter, in a purely arbitrary fashion as before, as the horizontal and vertical directions respectively. According to the invention the arrangement of the memory 1 includes sixty-four acceptance zones such as Z that are distributed in four columns designated respectively 2,3,4 and 5 of 16 acceptance zones such as Z. Each acceptance zone Z is composed, according to the invention, of two distinct regions, an upper region $Z_1$ and a lower region $Z_2$ adjacent to each other along an imaginary horizontal line the prolongation of which locates a word selection line such as 6, for example. On this word selection line, 64 words of 16 bits each are written in the vertical Y sense, as shown schematically in FIG. 1 by the shaded surfaces such as 7.

The memory shown in FIG. 1 thus contains 64 × 64 = 4,096 words, which corresponds to the number of binary digits equal to 4,096 × 16, or 65,536, because each word is composed of 16 bits. Such a memory easily fits on the interior or the exterior of a cathode ray tube screen measuring 10 cm on a side.

Figure 2:
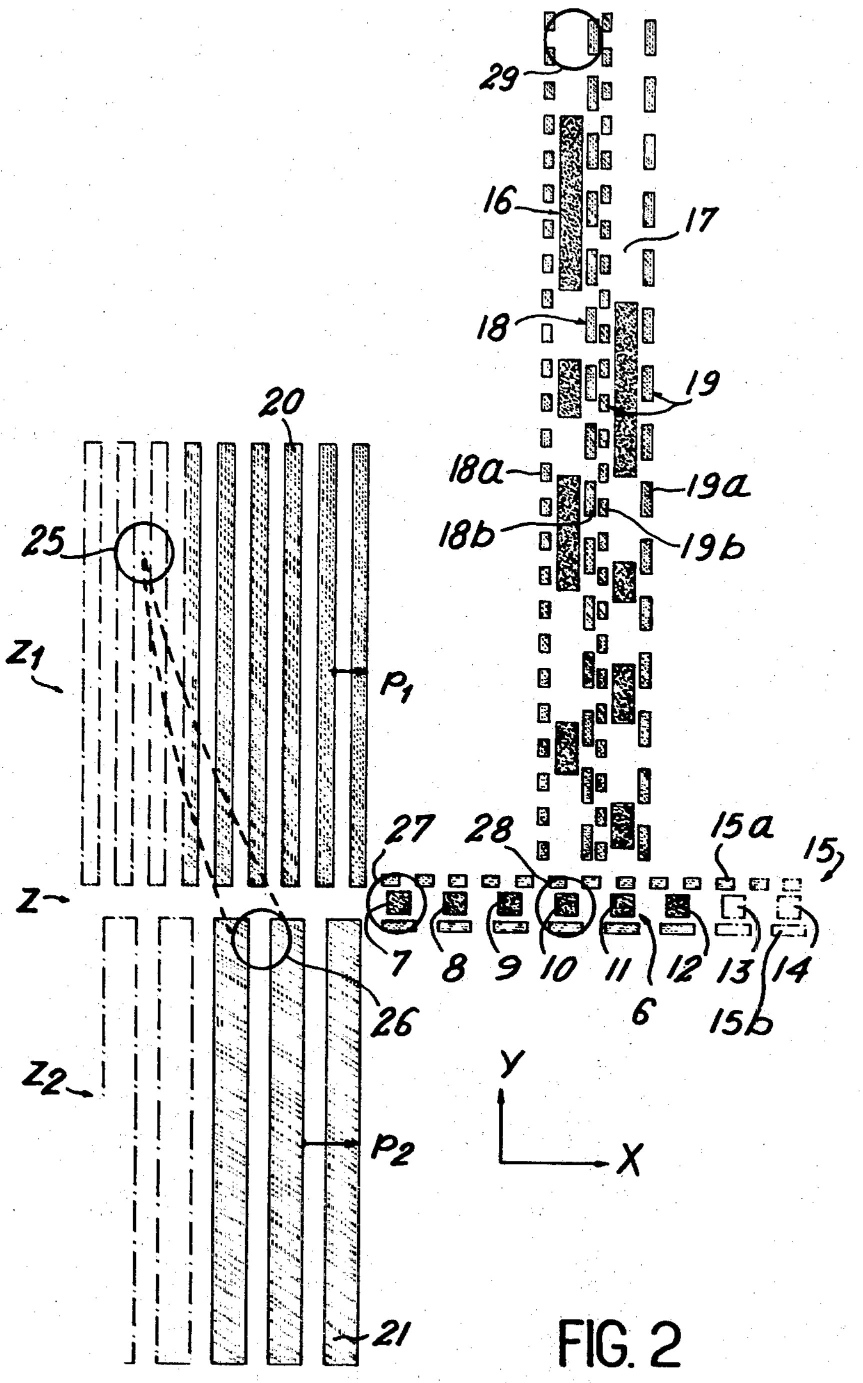
FIG. 2 shows in detail a portion of the memory of FIG. 1 on a greater scale.

FIG. 2 shows in more detail the operating organization of one of the surface elements of the memory of FIG. 1. In FIG. 2 there is, again, an acceptance zone Z composed of an upper region $Z_1$ and a lower region $Z_2$, the word selection line 6 comprising a certain number of counting spots such as 7,8,9,10,11,12,13 and 14 surrounded by a guide stripe 15 comprising the upper guide 15a and the lower guide 15b. Along the abscissae corresponding to the counting spots 10 and 11 there are inscribed in the Y direction the two words 16 and 17 which, in the particular example described have their own guide stripes 18 for the word 16 and 19 for the word 17, consisting respectively, for the stripe 18, of the two guides **18*a* and 18*b* and, for the stripe 19, of the two guides 19*a* and 19*b*. Of course, it is only for the purpose of simplifying the drawing that just the two words 16 and 17 are shown in FIG. 2; in fact, there are as many words provided on the memory as there are counting spots on the line 6**.

In the example illustrated in FIG. 2, the surface of the region $Z_1$ is covered by an array of vertical stripes 20 having a periodicity $P_1$ in the horizontal direction, while the region $Z_2$ is covered by an array of vertical stripes 21 having a periodicity $P_2$ in the horizontal direction. The guide stripes 15, 16 and 17 likewise have guides **15*a*,18*a* and 19*a* of periodicity $P_1$ and guides 15*b*,18*b* and 19*b* of periodicity $P_2$. The arrays 20 and 21**, as well as the various guide stripes may be made of fluorescent materials, for example having fluorescence in the ultraviolet region of the spectrum, that are subject to be activated by the beam spot when the memory is located in the evacuated interior of a cathode ray tube, or they may be simply opaque areas or areas of selectively colored light transmission, if the memory is an exterior type memory as previously described. In the case last mentioned, the light emitted by the cathode ray tube phosphor must at all points of the screen have a sufficiently extensive spectrum to include all the transmission frequencies of the selective filters constituted by the colored transmission zones.

The addressing method of this invention then carried out in the three steps, of which it is composed, in the following manner, supposing for example that it is desired to read the word 16 located for access through the acceptance zone 22 (FIG. 1).

During the first step of the sequence, the beam spot leaves the center position 23 of the memory 1 and is approximatively moved by predetermined analog deflection forces to some point of the acceptance zone 22, along the trajectory marked in the dot-dash line 24 of FIG. 1. The position 25 then reached by the spot is located, for example, in the region $Z_1$ of FIG. 2, and now the second step of the sequence begins. Under the influence of horizontal sweeping, which is now put into effect, the spot 25 produced by the beam generates a first signal having a frequency $f_1$ corresponding to the periodicity $P_1$ of the array 20, and this signal when applied to the vertical deflection plates causes the spot to descend very rapidly till it meets the region $Z_2$ at 26, where it will then generate a second signal of frequency $f_2$ resulting from horizontal sweeping of the array $P_2$; the error signal produced by comparison of the two signals of frequency $f_1$ and $f_2$ detected by a photoelectric cell (not shown) picking up light from the surface of the memory 1, is in turn applied, after the necessary transformations, to the vertical deflection plates and enables the spot to be quickly brought into the position 27 corresponding to the entrance to the word selection line 6. Once arrived at 27, the spot is then taken in charge by the guide array 15 which it is constrained to follow virtually as a horizontal rail. It then counts in passing the counting spots 7,8,9 and 10 to stop on the spot 10 corresponding to the word 16, in the position 28.

At this moment the third and last step of the sequence begins. That is, with its x coordinate being held at a constant value, the spot 28 at this moment taken in charge by the guide 18, sweeps the entire extent of the word 16 being now guided by vertical deflection in the Y direction. When it reaches 29, the word having been entirely read (by transparence or by reflection, by means of the photoelectric cell not shown) the spot is then liberated and returns to the center of the memory where it is ready to begin again with a subsequent cycle.

Figure 3:
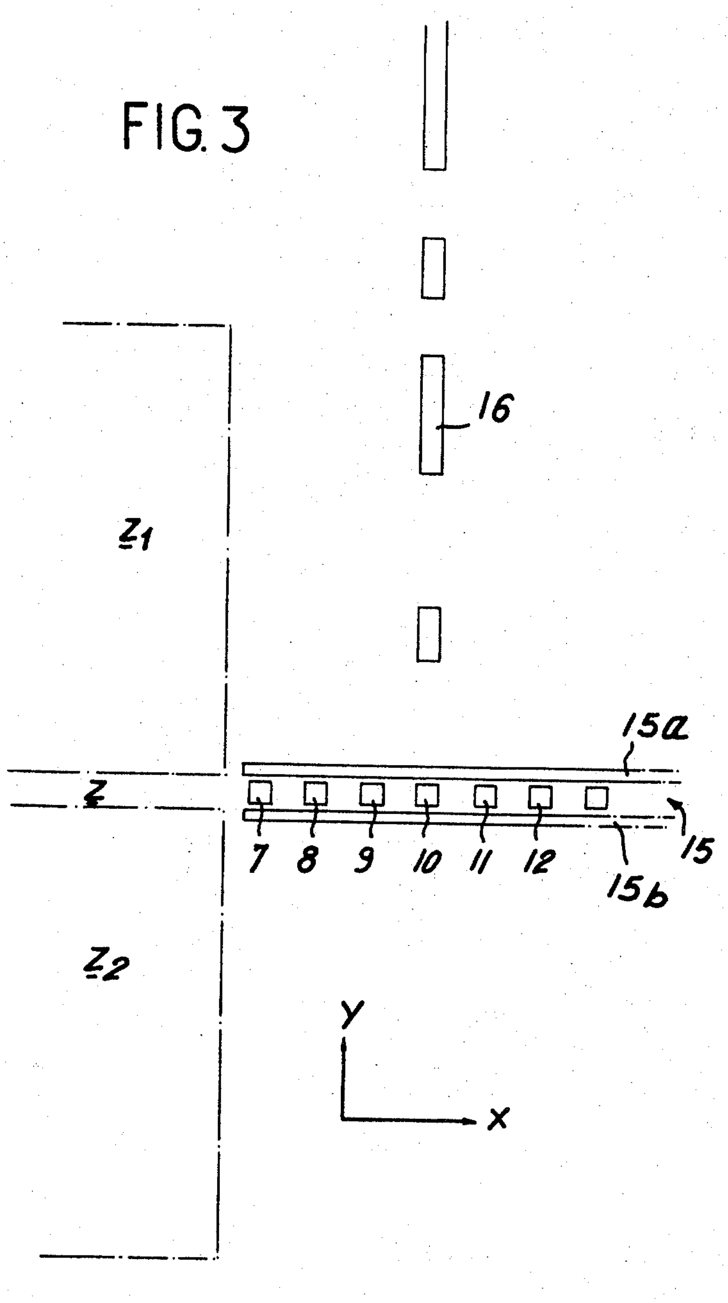
FIG. 3 is a diagram showing a variation of the form of the invention shown in FIG. 2.

An embodiment of the invention that is particularly interesting on account of its simplicity is, as already mentioned the form in which the memory is exterior to the cathode ray tube. This is shown in FIG. 3, which is, strictly speaking, only a variation of FIG. 2, with the zones $Z_1$ and $Z_2$ as well as the guides *15a* and *15b* of the guide stripe 15 constituted as continuous zones selectively transmitting colored light. The area $Z_1$ and the guide 15a are formed of a filtering material that transmits colored radiation of a wavelength $\lambda_1$ and light is emitted by the impact of the beam spot on the luminescent screen serving to activate the memory. Likewise, the zone $Z_2$ and the guide *15b* are constituted of a filtering material that transmits in the same way colored radiation having a wavelength $\lambda_2$.

In the example shown in FIG. 3, there are found, again, as in FIG. 2, the counting spots 7,8,9,10,11,12,13,14 etc. . . . which each correspond to the position of a word arranged in the vertical direction Y and in this case a single one of these words, indicated at 16, is shown in FIG. 3. These counting spots and the inscribed words are likewise physically realized by selective color transmission zones having a wavelength $\lambda_3$.

Figure 4:
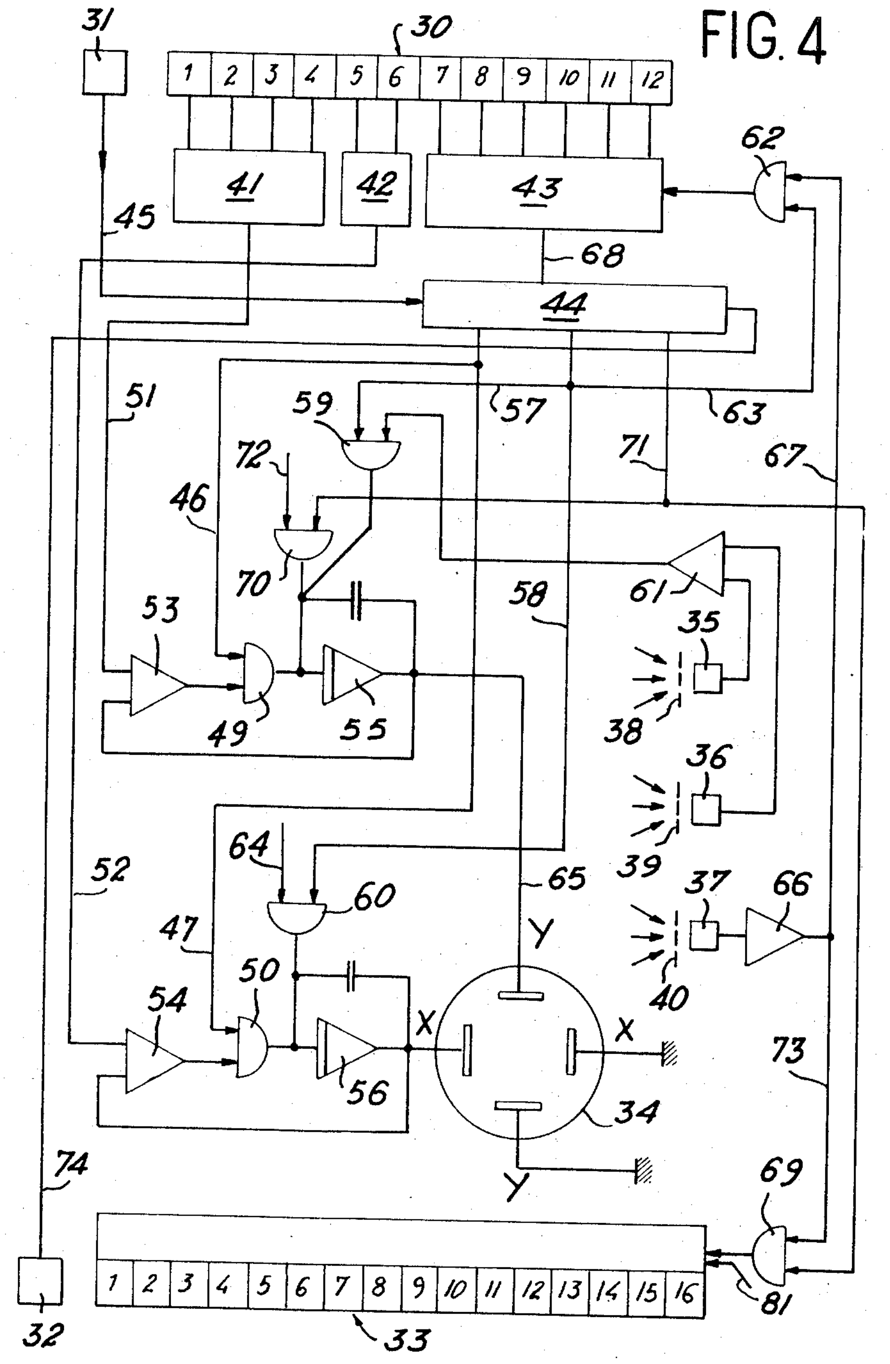
FIG. 4 is a diagram of the electronic control logic for the X and Y deflection systems for enabling access to a memory of the general type of FIG. 1 and of the variation thereof shown in FIG. 3.

With reference, now, to FIG. 4, an electronic circuit will be described suitable for operating a memory constituted as shown in FIGS. 1 and 3, i.e., a memory in which the overall arrangement is that of FIG. 1 and in which the details of each unit correspond to the embodiment shown in FIG. 3. In the example of FIG. 4, the addressing of the beam is directed by means of a computer not shown, of which the address register 30 is shown, however. This address register is capable of holding 12 binary digits in the cells respectively numbered 1 to 12. The interrogation device 31 is likewise part of the computer which is not shown, as is also the case with the read circuit 32 and the shift register 33 of which the sixteen positions are numbered 1 to 16. On this same FIG. 4 is also shown the cathode ray tube 34 represented diagrammatically with its horizontal deflection plates X and its vertical deflection plates Y. There are also three photoelectric cells 35,36 and 37 provided with their respective color filters 38,39 and 40. The cells 35 and 36 are used to detect colored signals coming from the orienting regions $Z_1$ and $Z_2$ of FIG. 3 and coming from guides on a guide stripe, such as 15a and 15b of FIG. 3. The photoelectric cell 37 is used to read words such as 16 of FIG. 3 and to count the counting spots such as 7,8,9,10, 11,12,13 and 14 also of FIG. 3.

The first four sections of the address register 30 of the computer feed a digital to analog converter 41 which is thus capable of accepting 2 to the 4th = 16 different analog levels, each one of these levels corresponding to the ordinate of one of the sixteen acceptance zones contained in each of the columns 2,3,4 and 5 of FIG. 1.

The next two sections, shown at 5 and 6, of the same address register 30 feed a digital to analog converter 42 which is thus capable of taking any of $2^2 = 4$ different analog levels, which correspond to the X ordinates of the columns 2,3,4 and 5 of FIG. 1.

A countdown circuit 43 is set by the six last sections (7,8,9,10,11,12) of the address register 30 and may in consequence provide an analog output at any of $2^6 = 64$ levels, in which each one corresponds to one of the centering or counting spots of the word selection line 6 of the memory of FIG. 1.

The overall control of the circuit of FIG. 4 is directed by a sequencer 44 according to the following sequence of operations which, in accordance with the invention, takes place in three successive steps, preceded by a display or registration step.

DISPLAY:

The computer having decided to examine a certain word, begins by displaying in the twelve section address register 30 the address elements corresponding to the chosen word. For this purpose, the first four sections of the register 30 receive the value y corresponding to the ordinate of the acceptance zone of the word to be examined, the two following sections 5 and 6 receive the abscissa x of this same acceptance zone and the last six sections 7,8,9,10 and 11 receive information identifying the ordinal number of the counting spot relating to the word being sought and appearing on the word selection line associated with the acceptance zone.

STEP NO. 1:

The interrogator 31 then provides an interrogation order to the sequencer 44 over the connection 45. The sequencer 44 sends over the connections 46 and 47 a signal which opens the gates 49 and 50, which then enables the application on the deflection plates of the cathode ray tube 34 of voltages corresponding to the two analog coordinates produced by the converters 41 and 42 and corresponding to the values *y* and *x* of the acceptance zone in which the spot must be placed. For this purpose, the analog value *y*, produced by the converter 41, is transmitted over the connection 51 and the gate 49 to the plates Y of the tube 34 and the value *x* given by the converter 42 is brought by the connection 52 and through the gate 50, that has just been opened, to the horizontal deflection plates X. The differential amplifiers 53 and 54 assure the proper reproduction of the signals which are applied to them by the integraters 55 and 56 respectively through the gates 49 and 50.

At the end of step No. 1, accordingly, the integrators 55 and 56 are charged to the output values of the two analog converters 41 and 42 and the memory access beam has its impact point exactly within that one of the 64 acceptance zones which has been chosen for the word to be examined.

STEP NO. 2:

At this moment, the sequencer 44 initiates the second step by reclosing the gates 49 and 50, leaving the integrators 55 and 56 clamped their respective voltage levels. The sequencer 44 then opens the gates 59,60 and 62 over the connections 57, 58 and 63. The gate 60, in opening, enables the application to the integrator 56 of the constant voltage present on the connection 64. The integrator 56 then provides a signal increasing linearly with time which, applied to the horizontal deflecting plates, forces the beam to be displaced horizontally to the right (for an observer who looks at FIGS. 1,2 or 3) at a constant speed. This is the beginning of a horizontal sweep.

At the same time, the opening of the gate 59 has the result that the vertical position control signals of the spot generated by the guide means and transmitted through the photocells 35 and 36 equipped with their colored filters 38 and 39 are combined in the differential amplifier 61 and reach the vertical sweep plates Y through the gate 59, the integrator 55 and the connection 65. The beam is then, according to the invention, constrained to follow the boundary between the two regions $Z_1$ and $Z_2$ of the acceptance xone, and then to enter upon the horizontal word selection line corresponding to the word being sought.

At the same time that the gates 59 and 60 were opened, the gate 62 was likewise opened by an order of the sequencer 44, transmitted in this case by the connection 63. The result is that the counting by the cell 37 of the counting spots of the word selection line gives rise to the transmission of successive pulses which are amplified by the amplifier 66 and transmitted by the connection 67 to the countdown circuit 43 through the open gate 62. Countdown circuit 43 then counts down from the value set at the beginning of step No. 1 by the address register 30 all the way down to 0. When it actually reaches 0, a signal is transmitted over the connection 68 to the sequencer 44 which closes the gates 59, 60 and 62 and thus stops the sweep in the X direction and the counting of the counting spots.

STEP NO. 3:

At this point, the beam is immobilized opposite the end of the word that it must read. The sequencer 44 now initiates step No. 3, which is the actual reading step, by opening the gates 69 and 70 with an order transmitted over the connection 71. A constant voltage coming from the connection 72 is then transmitted through the gate 70 and the integrator 55 to the vertical deflection plates Y. This accordingly initiates a vertical sweep of the beam at constant speed. During all of this sweep, the beam passes over the word to be examined and the photocell 37 transforms the bits read in passing into pulses, which are transmitted through the amplifier 66 and the connection 73 to the gate 69. The latter being open as just mentioned, transmits these pulses as they arrive into the sixteen position shift register 33 in synchronism with the clock pulses started at the beginning of step No. 3 (by means not shown) which are injected into the register 33 by the clock pulse generator 80 over the connection 81.

When the register 33 is full, the sequencer 44 sends an order out over the connection 74 to the read circuit 32 which then transmits to the computer a permission to read the word contained in the register 33. At the same time, the sequencer 44 puts an end to the vertical Y sweep and the apparatus is then ready for a new reading cycle which will be initiated by the computer at a chosen moment.

Figure 5:
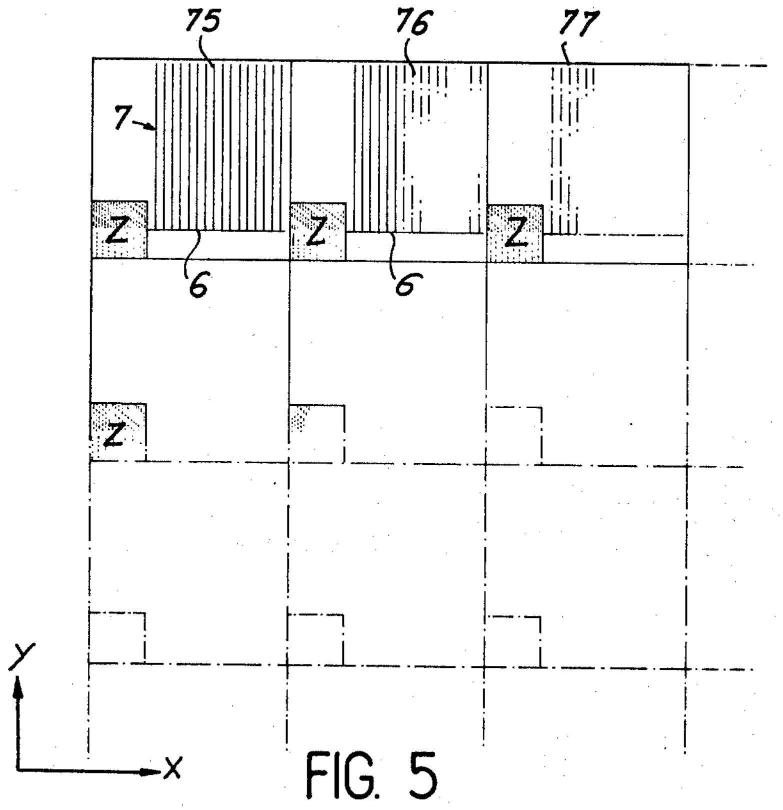
FIGS. 5 is a diagram showing a memory according to the invention composed of an assembly of semiconductor chips.

In FIG. 5, there is schematically shown a semiconductor memory composed of an array of elementary chips such as 75,76,77,78, etc. . . . , each of these chips having an acceptance zone Z to which a word selection line 6 is associated and also an area 7 on which the words in question are registered. The acceptance zones Z and the word selection line 6 are directly produced by photolithography at the time that each of the chips is made. Information is inscribed in the zones 7 on integrated bistable elements, each of which comprises at least one reading transistor and two transistor forming the flipflop of which the state is either 1 or zero. In the example of FIG. 5, the memory plane measures 64 mm on a side and is composed of 32 × 32 = 1,024 elementary chips each measuring 2 mm on a side. On each of these chips, such as 75,76,77,78 etc. . . . , the acceptance zone measures 0.6 mm on a side and the memory zone proper, covering a surface of 1.4 × 1.4 mm, comprises 32 columns of 32 bits, thus 32 × 32 = 1,024 bits. The complete memory plane thus comprises 1,024 × 1,024 ≈ 1 MBIT.

According to the invention, addressing such a memory for reading or writing is accomplished by sequentially associating a dynamic phase, during which the spot is brought to an acceptance zone Z and then partially traces the word selection line 6 associated thereto, with a subsequent static phase where the word is read, with the assistance of a switching device 80, by simple successive examination of the bistable elements of the surface 7 situated on the same vertical line in the direction Y.

Figure 6:
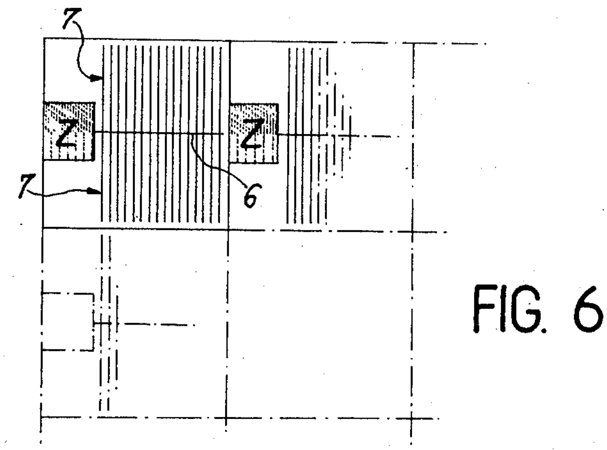
FIG. 6 shows a variation of the embodiment of the invention shown in FIG. 5.

By way of example, duration of the three phases just mentioned are:

- 10 nanoseconds for the addressing by analog methods of one of the 1024 acceptance zones;
- 320 nanoseconds for addressing a word selection line (sweep in the X direction);
- 320 nanoseconds for reading the word (32 bits; sweep in the Y direction); thus, a total period of 650 nanoseconds for a capacity of 1 MBIT. In a modified form of the invention, the reading of a word line may also be broken down into two half columns of 16 bits each, by reversing the sense of the vertical deflection Y, in which case the acceptance zone Z and the word selection line 6 are, as shown in FIG. 6, arranged on a center line of each elementary chip.

Such a memory can be used in several different ways. When the memory is placed inside a cathode ray tube, the drive means and the counting spots comprise conducting portions by which a portion of the cathode ray beam current completes its circuit. Some of this portion of the beam current, completing its path through the guide means with periodicity $P_1$ and $P_2$ is impressed with the frequency components $f_1$ and $f_2$ used to form the error signal. This error signal can likewise result from the difference of the portions of the beam current that complete their path respectively by a continuous upper guide and a continuous lower guide of each guiding stripe. As for the portion of the beam current which completes its path through the integrated bistable active elements, it is used for reading and writing information from and on these bistable elements and it is precisely because of this current that the economy of electric connections is realized compared to the semiconductor memory apparatus of the prior art. According to the invention, in fact, there remains only, as connections between the individual chips constituting the memory, the common bus, the power bus and the read-write circuit.

When this type of memory is placed on the outside of a cathode ray tube, examination is then accomplished by a light beam which may be either generated directly by the luminous spot on a luminescent screen of a cathode ray tube if the memory in question is placed directly against the exterior surface of the screen of such a tube or else by a luminous addressing beam of conventional form (either of coherent light or otherwise) if the memory is used completely independently of any cathode ray tube. In one case as in the other, the guiding means, the bistable elements and the counting spots comprise:

a. either photoemissive portions, so that reading, writing and guiding are accomplished by the detection of electron currents used by electromagnetic irradiation on the surface of the memory, which brings the matter back to the preceding case;

b. or else photoconducting portions, so that reading, writing and guiding are accomplished by detection of variations in the flow of current delivered by an exterior voltage source which is applied to the active elements of the memory.

The choice between a memory working in air at atmospheric pressure and addressed by a light beam and a memory enclosed in an evacuated space and addressed by an electron beam depends upon various considerations, but one may simply recall that if in theory it seems more convenient to work in air with an addressing light beam, on the contrary, the necessary deflection techniques for a light beam are much more complicated and consequently much more expensive than the deflection techniques for an electron beam in a vacuum. In the latter case, since the intensity of the electron current necessary for addressing such a memory is very small (for example of the order of a fraction of a microampere) it is possible to use a semiconductor type cold cathode as a source of electrons.

Numerous variations in the light of known devices and principles, can be utilized in order to provide reading and writing for a memory point of the matrix surface. For example, the method used for the case where the memory is located in vacuum and addressing is done with an electron beam is described here below.

1. READING OF A MEMORY POINT

In the embodiment last described, each point of the surface to be examined is constituted by a certain number of transistors of which one, known as the read transistor, is exactly the one on which the beam is addressed by the guiding system of this invention and of which two other transistors constitute the bistable circuit proper. At first, only a low value of current is given to the electron beam (in the neighborhood of 10 nanoamperes, for example) in order to establish only the guiding current for the spot on the surface of the memory. When the addressing to the point in question is accomplished, a pulse is sent to the read transistor by multiplying the intensity of the beam current by a factor of 10, which brings it to a value in the neighborhood of 100 nanoamperes, which is used as a reading current. The state of the bistable circuit in question, whether zero or 1 is then read, by observing whether an electric response pulse is detected on the common bus.

2. WRITING

As before, a preliminary addressing of the electron beam is made to the read transistor of the point at which it is desired to write information. A secondary addressing, accomplished by a very slight complementary deflection, then enables one of the bits 1 or zero to be written on the transistors of the bistable circuit in question.

Each memory element of the chips making up the memories of FIG. 5 or FIG. 6 may be constituted of a flipflop circuit using transistors of either the bipolar of the field effect type making the latter case usually of the MOS variety. Various flipflop circuits suitable for memory elements are described in the January 1972 issue of "Control Engineering" at pages 57 and 58. By way of illustration, the utilization of such a flipflop circuit organized in accordance with FIG. 5 or FIG. 6 is shown by the circuit diagram of FIG. 7 which is patterned after FIG. 2 on page 58 of the article just referred to. The circuit is called a static MOS cell and is a flipflop composed to two cross-coupled MOS transistors 91 and 92. Two additional MOS transistors 93 and 94 act as dynamic load resistors for the switching transistors 91 and 92. Transistors 95 and 96 are read transistors which transfer information in the cell to the bit lines 97 and 98 respectively.

Figure 7:
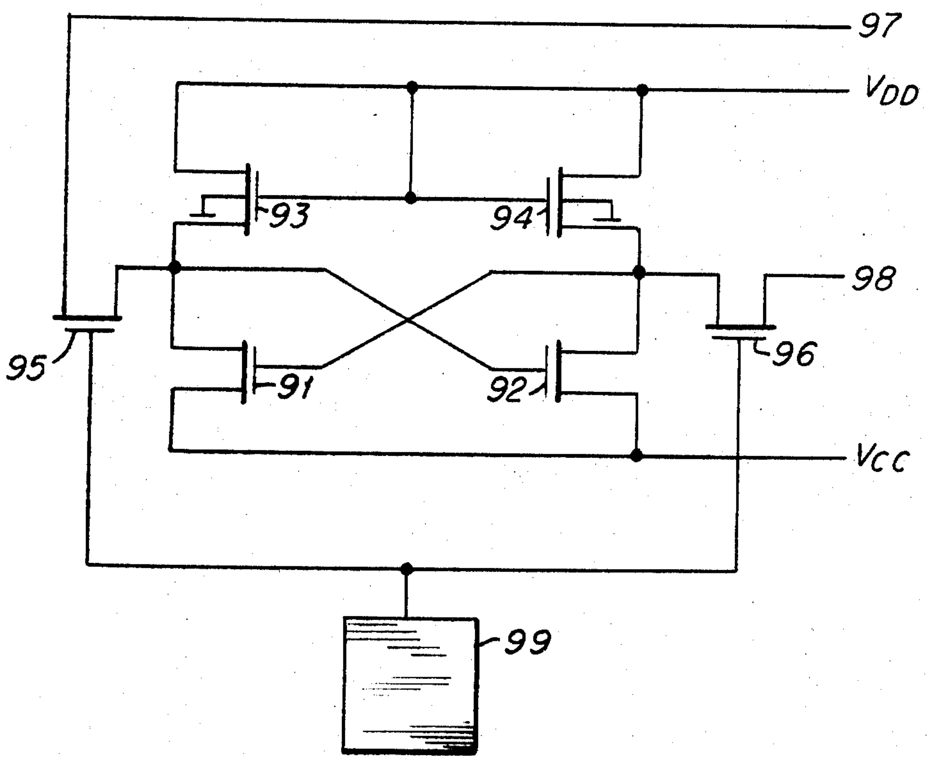
FIG. 7 is a circuit diagram of a single active memory element in the memories of FIG. 5 and FIG. 6.

FIG. 7 differs from the diagram in the cited article in that the connection of the control electrodes of the read transistors 95 and 96 are connected to an "address spot" the form of a small conducting area which the addressing beam may sweep, rather than to the circuitry of a "word line".

When the beam is present on the addressing spot of the memory cell, the beam current path is completed in such a way that the transistors 97 and 98 are made conducting. In the case illustrated above this reads the information of the memory cell, but this may also be caused to write information into the cell. Reading or writing is accomplished from this point on in the conventional manner by the transfer of information to the bit lines 97 and 98, the circuits of which are both completed by high impedences for the reading case or, on the other hand, by low impedences for the writing case connecting one line to the power bus VDD and the other to the power bus VCC, or vice versa, according to whether a 1 or a zero is to be written into the cell. The polarity of the transistors is to be chosen with regard to the fact that the beam current comes from an electro-negative source and returns to the positive side of the beam current supply.

The four connection lines or buses VDD, VCC, 97 and 98 are common to all the memory elements provided with buffer amplifiers to the extent necessary is well known, and in an array of cells of the type shown in FIG. 7, only the addressing spot or platelet 99 is individual to the memory point or element.

Among the advantages provided by the application of the method of this invention to integrated semiconductor memories, the fact may be cited that the different chips constituting the surface being totally independent of each other, the precision of their positioning on the surface may be quite poor, for example of the order of 0.1 mm on each axis which facilitates their mounting by simple juxtaposition, and this all the more because only three or four connections at most need to be provided between one chip and an adjacent chip. Replacing the electrical connections of the prior art by connections effectuated directly by means of an electron beam or a light beam which explores the surface of the memory also leads to a remarkable simplification of the device and to a considerable reduction of the manufacturing cost of the equipment.

Just as it was pointed out in connection with FIG. 6 that the word stripes which contain the memory cells making up each addressable word may be disposed so as to extend on both sides of a word selection line or stripe, in a similar way the word selection stripes can extend on both sides of their respective acceptance zones, with the polarity of the X deflection determining which portion of the word selection stripe of the particular acceptance zone will be swept. The choice of polarity is in that case determined by 1 bit of the address information.

The term "word" of course means all the stored information that is to be retrieved at the particular address and, for the purpose of this description, includes any stop bit or character at the end even though in a particular readout system that bit or character may not be displayed with the information retrieved.

As may be gathered from the foregoing description, the concept of a word selection line is realized in practice by what is better described as a word selection stripe containing the counting spots in the middle and the guide borders at the edges. The counting spots may be regarded as dividing the word selection stripe into elementary segments defined by the places at which the X sweep is stopped for the addresses of the respective counting spots. The distance of the X sweep along the word selection stripe is determined by digital methods even though the sweep may be at a uniform velocity rather than step by step and the distance hence will always be equal to an integral number of elementary segments of the stripe, one for each counting spot. Of course, if desired, stepwise deflection of the beam may be used although that would require fast acting digital circuits.

Because of their small size, the distinctive regions of the acceptance zones may be referred to as "patches."

Although the invention has been described with respect to particular embodiments, it will be understood that modifications and variations are possible within the inventive concept without departing from the spirit of the invention.

DESCRIPTION OF FIG. 8.

Figure 8:
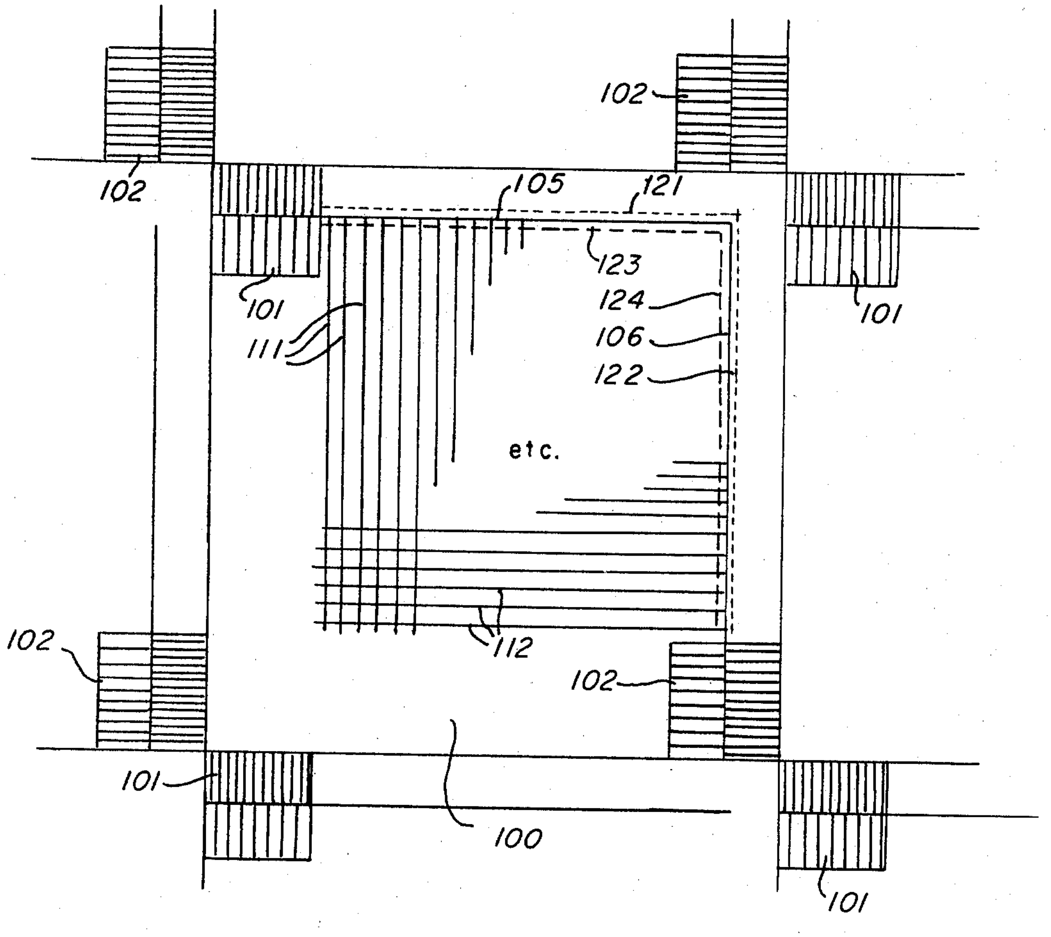
FIG. 8 shows another variation of memory system using a mosaic of semiconductor memory chips.

Another variation of memory system using a mosaic of semiconductor memory chips is shown in FIG. 8. In this case each chip, such as the chip 100, has two acceptance zones 101 and 102. In this case the cathode ray tube has two beams that are independently deflectable by separate deflection systems at least for the second and third steps of addressing. In the first step the beams move with one beam a little offset from the other and are deflected together until one lands on the acceptance zone 101 and the second on the acceptance zone 102 of chip selected by its coarse address. Then one beam is swept in the X direction on the selection stripe 105 and the other in the Y direction along the selection stripe 106 until they stop at the addressed counting spots. When the beam stops, it is intensified so that the selected lateral conductors from the arrays of conductors 111 and 112 are sufficiently energized by the beam current to read (or write) as the case may be, the memory cell defined by the intersection of the selected conductors on the diagram of FIG. 8. The cell reached both by the selected 111 conductor and the selected 112 conductor is read (or written into, as the case may be).

Tracking of the beams to and along the selection stripes 105 and 106 is accomplished in the same way as in the other embodiments of the invention as indicated by the grid guide regions of the acceptance zones 101 and 102 and the stripe border guides 121,122, 123 and 124.

I claim:

1. A method of addressing the access beam of a beam-accessed two-dimensional information storage memory array adapted to store binary coded information in the form of addressable words of which the bits are aligned in one of said dimensions, hereinafter referred to as the first dimension, comprising the steps of:

deflecting said beam, by means of analog forces representative of the desired address, to an approximate address in the neighborhood of the exact address to which access is desired;

further deflecting said beam from said approximate address to an entrance extremity of a word selection stripe running in the second of said dimensions and along said word selection stripe over a number of digital segments defined by digital address information, under constraining influence of guide means interposed in said memory array in two mutually distinct patches in the area of said approximate address and in mutually distinct borders on each side of said word selection stripe and adapted to be swept by at least an edge of said beam during such deflection along said word selection stripe, and further deflecting said beam in said first dimension over a number of digital segments corresponding to the length of the addressed word stripe and thereby reading or writing a word from or into said memory.

2. An addressing method as defined in claim 1 in which said step of deflecting said beam in said first dimension to read or write said word is performed under constraining influence of guides interposed in said memory array on each side of said addressed word stripe and adapted to be swept by at least an edge of said beam during said reading or writing deflection step.

3. An addressing method as defined in claim 1 in which deflection under constraining influence of said guides is performed by the steps of:

electrically detecting electronic or radiant indications including two distinct components from mutually distinct portions of said guide means during sweeping of said approximate address area and said word selection stripe by said beam;

preparing an error signal by comparing the respective amplitudes of said distinct components of said indications, and modifying the deflection orthogonal to the direction of sweep under control of said error signal.

4. A memory for beam-accessed two-dimensional storage of binary coded information, said dimensions being referred to as directed in the X and Y directions, having an array of one bit memory elements, arranged in word stripes aligned in the Y direction on a memory plane support and beam projection and deflecton means for selectively accessing each of said memory elements, and comprising, interposed in said array:

a plurality of acceptance zones each composed of two regions having a common boundary aligned in the X direction and respectively having means for generating pairwise mutually distinctive signals when swept in the X direction by the beam of said beam projecting means;

a plurality of word selection stripes respectively associated with said acceptance zones and centered on lines extending the said inter-region boundaries of said zones, said word selection stripes having a plurality of counting spots respectively corresponding to word positions, and guide borders on each side of said word selection stripes comprising means in the case of each stripe, for generating pairwise mutually distinct signals when said beam is deflected to sweep the corresponding stripe;

said beam deflecting means of said memory further comprising means for deflecting said beam to a selected acceptance zone and sweeping it therefrom in the X direction along a word selection stripe associated with said zone, under digital control responsive to sweeping said counting spots, to the selected word position and thence in the Y direction over a selected word, and means for incremental deflection in the Y direction as needed for tracking during said sweeping in the X direction under control of an error signal obtained by comparing said mutually distinct signals generated by the aforesaid means for generating the same.

5. A memory as defined in claim 4 in which said means for generating mutually distinct signals, both of said zones and of said stripes, are secondary electron emissive areas and stripes or lines interrupted in the X direction by gaps having pairwise mutually distinct spatial periodicity and in which said beam is an electron beam.

6. A memory as defined in claim 4 in which said means for generating mutually distinct signals, both of said zones and of said stripes, are phosphor coated areas and stripes interrupted in the X direction by gaps having pairwise mutually distinct spatial periodicity and in which said beam is an electron beam adapted to excite said phosphor coated areas to luminescence.

7. A memory as defined in claim 4 in which said means for generating mutually distinct signals, both of said zones and of said stripes, are areas and stripes of materials adapted to emit or transmit light of pairwise distinct colors when said beam is swept thereover.

8. A memory as defined in claim 4 in which said memory array and said zones and stripes interposed therein are provided on a luminescent cathode ray tube screen and in which said addressing beam is the reading and writing access beam for said memory.

9. A memory as defined in claim 4 in which said memory array and zones and stripes interposed therein are inscribed on a transparent plate placed against the external surface of the screen of a cathode ray tube of which said beam is the scanning beam and effects reading, writing of said memory and also activates beam guidance by causing light transmission through the glass of said cathode ray tube.

10. A memory as defined in claim 9 in which the portions of the inscribed transparent plate relating to said zones and stripes, including both word selection stripes and word stripes, and to said counting spots are constituted of zones of selectively colored light transmission transmitting to the outside only radiation of wave lenghts $\lambda_1$, $\lambda_2$ and $\lambda_3$ of the light spectrum produced by the screen luminescence, and in which, further, means for selectively and simultaneously detecting radiation of wave lengths $\lambda_1$, $\lambda_2$ and $\lambda_3$ are provided on the outside of said inscribed transparent place for receiving information for generating said error signal, for counting said counting spots and for reading words of said memory array.

11. A memory as defined in claim 4 in which said memory array and zones and stripes interposed therein are formed of a plate of light sensible material located in the ambient air and in which said beam adapted to sweep said plate is a light beam and said beam deflecting means are apparatus adapted to induce changes in the index of refraction of at least a portion of the medium through which said light beam travels.

12. A memory as defined in claim 4 in which said memory array and zones and stripes interposed therein are formed by an assembly of a multiplicity of elementary semiconductor chips each comprising integrated active element circuits and in which each of said elementary chips has its own acceptance zone and its own word selection stripe inscribed on the chip during the manufacture of its said integrated circuits, and in which, further, means responsive to variations of beam current are provided to produce reading and writing of information from and into said memory array as said beam is swept in said Y direction as aforesaid and to effect counting of counting spots and stripe tracking as said beam is swept in said X direction as aforesaid.

13. A memory as defined in claim 12 in which interconnection of adjacent chips of said chip assembly are limited to a common circuit bus, not more than two power supply buses and not more than two read-write buses.

14. A memory as defined in claim 12 in which said chip assembly is placed in the evacuated enclosure of a cathode ray tube and in which said guide borders, zone regions, counting spots and integrated circuit active elements are in conducting paths through which at least a portion of the current of said beam is arranged to pass, and in which the portion of said beam current that passes through said guide borders and said zone regions is used to produce said error signal and the portion of said beam current that passes through said active elements is directly utilized for reading from or writing into said active elements.

15. A memory as defined in claim 12 in which said beam is a light beam and in which said guide borders, zone regions, counting spots and integrated circuit active elements consist of photoconductive or photoemissive elements or partly of photoconductive and partly of photoemissive elements.

16. A memory as defined in claim 12 in which said chips are rectangular the said acceptance zone of each chip is located on an axis of symmetry oriented in the X direction of said chip, in which the said word selection stripe of each chip is centered on said axis of symmetry and the said word stripes are provided extending in the Y direction from both sides of said word selection stripe on each chip.

17. A memory for beam-accessed two-dimensional storage of binary coded information, said dimensions being referred to as directed in the X and Y directions, comprising:

a mosaic of semiconductor active element integrated circuit chips adapted to be scanned by two electron beams independently in a single cathode ray tube respectively by two beam forming means and two beam deflecting means;

each chip of said mosaic having a two-dimensional array of one bit active storage elements switchably by a beam current above a predetermined minimum with a readout active element for each of said storage elements adapted to provide readout with a beam current below said predetermined minimum, each of said storage elements having also a first and second beam current connection for reading from and writing into said elements only when the current of one of said beams is applied to one of said beam current connections and the current of the other of said beams is applied to the other of said connections;

means for applying beam current to each chip including an acceptance zone for each of said beams and a selection stripe extending from said zones, in one case in the X direction in the other case in the Y direction, across said chip, and an array of conductors from each of said stripes across said chip in the Y direction from the X-directed stripe and vice versa, said conductors from one of said stripes connecting together, row by row, one of said beam current connections of each of said storage elements and said conductors from the other of said stripes similarly connecting the other of said beam current connections of each of said storage elements;

means for deflecting said beams to the respective acceptance zones of an addressed chip by analong deflecting forces, for thereafter deflecting one of said beams along said X directed stripe for an address-determined number of segments and the other of said beams similarly along said Y directed stripe and means for thereafter setting the beam current at a read or a write magnitude and for detecting the effect of the state of said storage element on a reading current;

guiding means in said zones and bordering said stripes adapted to generate two distinct kinds of signals when swept by one of said beams, and deflection tracking means responsive to signals generated by said beams and said guide means adapted to produce an error signal therefrom and to apply it to said deflecting means to track said beams respectively on said stripes.

* * * * *